United States Patent
Takagi et al.

(10) Patent No.: US 6,367,506 B1
(45) Date of Patent: Apr. 9, 2002

(54) SWITCH VALVE FOR HOT GAS CIRCUIT OF REFRIGERANT CIRCUIT

(75) Inventors: Noboru Takagi; Tetsuo Hirose, both of Ogaki (JP)

(73) Assignee: Pacific Industrial Company, Ltd. (JP)

( * ) Notice: Subject to any disclaimer, the term of this patent is extended or adjusted under 35 U.S.C. 154(b) by 0 days.

(21) Appl. No.: 09/535,453

(22) Filed: Mar. 24, 2000

(30) Foreign Application Priority Data

Aug. 18, 1999 (JP) .............................. 11-231145

(51) Int. Cl.$^7$ ............................... F16K 11/24
(52) U.S. Cl. ............... 137/881; 137/119.03; 137/119.1; 251/30.04
(58) Field of Search ................. 137/119.02, 119.03, 137/119.04, 119.09, 119.1, 881; 251/30.03, 30.04, 38, 44, 45, 46

(56) References Cited

U.S. PATENT DOCUMENTS 4,270,726 A * 6/1981 Hertfelder et al. ........ 251/30.03
5,299,592 A * 4/1994 Swanson ..................... 137/59

* cited by examiner

Primary Examiner—John Fox
(74) Attorney, Agent, or Firm—Akerman Senterfitt

(57) ABSTRACT

A switch valve is provided in a refrigerant circuit. The switch valve includes a first valve mechanism, a second valve mechanism, and a single valve housing incorporating the first and second valve mechanisms. The first valve mechanism is an electromagnetic valve. The first valve mechanism selectively connects and disconnects an outlet of a compressor with an inlet of a condenser in accordance with an electric current supply. The second valve mechanism is a differential pressure valve. The second valve mechanism selectively connects and disconnects the outlet of the compressor with an inlet of an evaporator in accordance with a difference between the pressure at the outlet of the compressor and the pressure at the inlet of the condenser. In this manner, the single switch valve, which includes the first and second valve mechanisms incorporated in the same valve housing, switches the refrigerant circuit between a path for a cooling operation and a path for a warming operation. This structure simplifies the configuration of the refrigerant circuit.

9 Claims, 4 Drawing Sheets

SWITCH VALVE FOR HOT GAS CIRCUIT OF REFRIGERANT CIRCUIT

BACKGROUND OF THE INVENTION

The present invention relates to switch valves used in air-conditioner refrigerant circuits, and more particularly, to switch valves used in refrigerant circuits having hot gas circuits.

A typical automotive air-conditioner refrigerant circuit includes a hot gas circuit. When the air conditioner warms the passenger compartment, heated and pressurized refrigerant gas (hereinafter referred to as "hot gas") circulates in the hot-gas circuit. FIG. 5 shows a prior art refrigerant circuit of an automotive air-conditioner. The refrigerant circuit includes a compressor 10, a condenser 11, a receiver 12, a check valve 9, a depressurizing device (expansion valve) 13, an evaporator 14, and an accumulator 15. These constituents are arranged in this order and connected with each other by a pipe 16 to define the refrigerant circuit. The compressor 10 is actuated by an engine (not shown).

A first electromagnetic valve 17 is located in a section of the pipe 16 between the compressor 10 and the condenser 11. A first bypass pipe 20 constitutes a hot gas circuit and has an inlet 20a connected to a section of the pipe 16 between the compressor 10 and the first electromagnetic valve 17. The first bypass pipe 20 also has an outlet 20b connected to a section of the pipe 16 between the depressurizing device 13 and the evaporator 14. Another depressurizing device 22 is provided in the first bypass pipe 20. A second electromagnetic valve 18 is located in the first bypass pipe 20 upstream from the depressurizing device 22.

The depressurizing device 22 depressurizes the hot gas discharged from the compressor 10 to a predetermined value.

The depressurized hot gas is then sent to the evaporator 14.

In this case, it is preferred that the pressure in the first bypass pipe 20 be 1.47 MPa upstream of the depressurizing device 22 and 0.20 to 0.39 MPa downstream of the depressurizing device 22.

A second bypass pipe 40 has an inlet connected to the section of the pipe 16 between the compressor 10 and the first electromagnetic valve 17. The second bypass pipe 40 further has an outlet connected to a section of the pipe 16 between the accumulator 15 and the compressor 10. Another depressurizing device 42 is provided in the second bypass pipe 40. A third electromagnetic valve 41 is provided in the second bypass pipe 40 and located upstream from the depressurizing device 42. The first to third electromagnetic valves 17, 18, 41 are controlled by a controller 100 constituted by, for example, a computer.

When the air conditioner cools the passenger compartment, the controller 100 opens the first electromagnetic valve 17 and closes the second and third electromagnetic valves 18, 41. Refrigerant thus circulates in the pipe 16 without passing through the bypass pipes 20, 40. Specifically, the compressor 10 sends high-pressure gas to the condenser 11. The condenser 11 condenses the gas and sends the gas to the evaporator 14 via the receiver 12, the check valve 9, and the depressurizing device 13. The evaporator 14 cools the ambient air by transferring heat between the ambient air and the condensed refrigerant. The heat transfer evaporates refrigerant, and the evaporated refrigerant gas returns to the compressor via the accumulator 15.

The depressurizing device 13 adjusts the amount of the refrigerant sent by the condenser 11 to the evaporator 14 in accordance with the temperature or pressure at the outlet of the evaporator 14. The accumulator 15 accumulates liquid refrigerant, or refrigerant remaining non-evaporated after passing through the evaporator 14. This structure prevents the liquid refrigerant from returning to the compressor 10.

When the air conditioner warms the passenger compartment, the controller 100 first performs a warm-up procedure for the warming operation. That is, the controller 100 closes the first and second electromagnetic valves 17, 18 and opens the third electromagnetic valve 41. The refrigerant gas from the compressor 10 thus returns to the compressor 10 via the second bypass pipe 40. The depressurizing device 42 in the second bypass pipe 40 increases the pressure of the refrigerant gas exiting the compressor 10 (the discharge pressure of the compressor 10).

When a predetermined time elapses after the controller 100 starts the warming operation, or when the discharge pressure of the compressor 10 reaches a predetermined value, the controller 100 opens the second electromagnetic valve 18 and closes the third electromagnetic valve 41. Accordingly, the air conditioner initiates a normal procedure for the warming operation. That is, the refrigerant gas discharged from the compressor 10, or hot gas, is sent to the evaporator 14 via the first bypass pipe 20. The evaporator 14 warms the ambient air by transferring heat between the ambient air and the hot gas. The refrigerant gas is thus cooled due to the heat transfer and is returned to the compressor 10 through the accumulator 15. In this manner, the refrigerant gas circulates in the hot gas circuit, which is formed by the first bypass pipe 20, when the air conditioner performs the normal warming procedure.

As described, in the prior art refrigerant circuit shown in FIG. 5, three electromagnetic valves 17, 18, 41 are used for switching the refrigerant circuit between the cooling operation and the warming operation. This complicates the circuit configuration and the circuit control procedure, thus raising the manufacturing cost and the power consumption.

SUMMARY OF THE INVENTION

It is an objective of the present invention to provide a switch valve simplifying configuration of a refrigerant circuit having a hot gas circuit.

To achieve the above objective, a switch valve according to the present invention comprises a single valve housing. A first passage is formed in the valve housing to permit a fluid to flow into the valve housing. A second passage is formed in the valve housing to permit, at selected times, the fluid in the first passage to exit the valve housing. A third passage is formed in the valve housing to permit, at selected times, the fluid in the first passage to exit the valve housing. A first valve mechanism is incorporated in the valve housing for selectively connecting and disconnecting the first passage with the second passage in accordance with an external instruction. A second valve mechanism is incorporated in the valve housing for selectively connecting and disconnecting the first passage with the third passage in accordance with the difference between the pressure in the first passage and the pressure in the second passage.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which.

DETAILED DESCRIPTION OF THE PREFERRED EMBODIMENT

Figure 1:
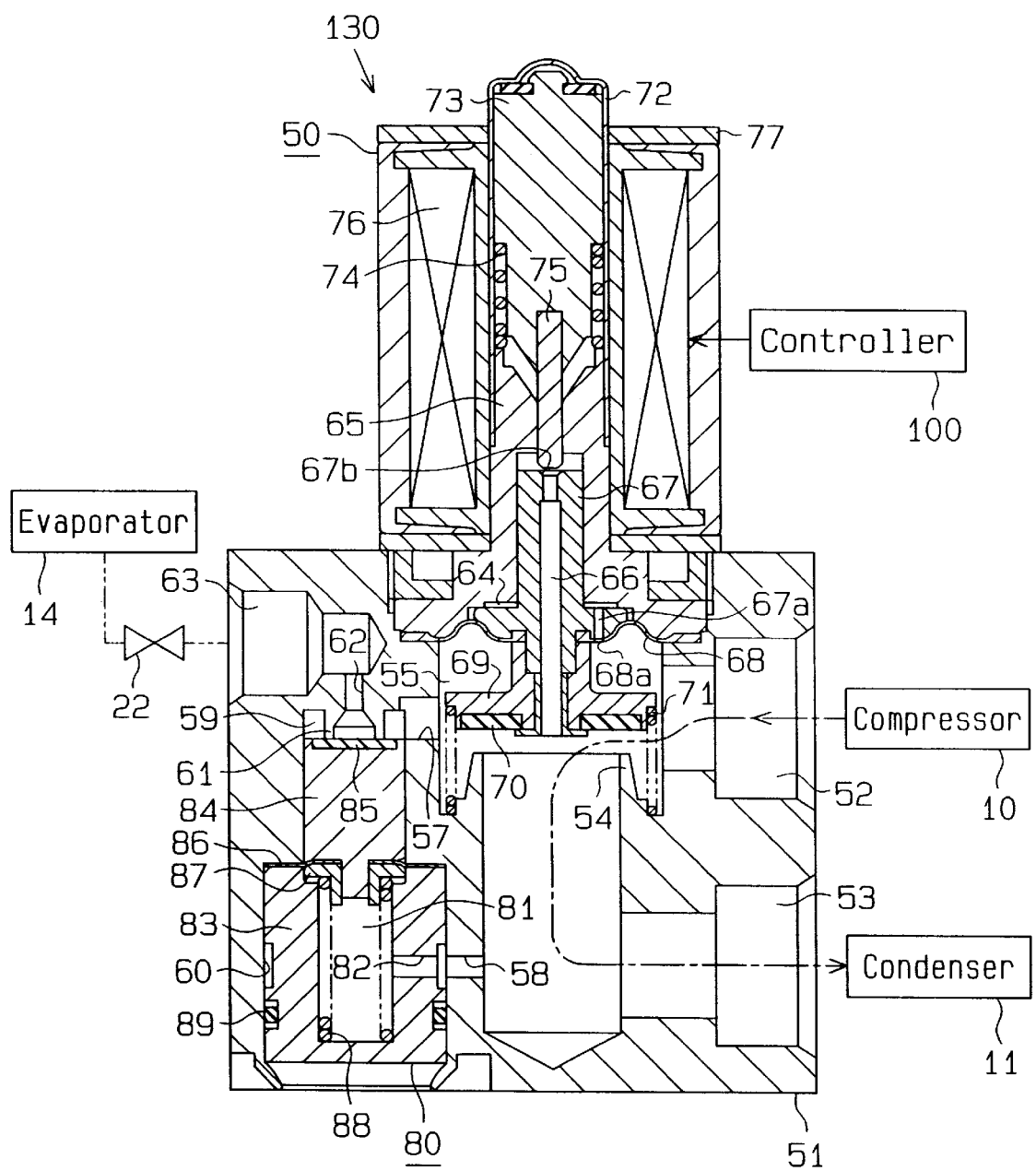
FIG. 1 is a cross-sectional view showing a switch valve of an embodiment according to the present invention when a first valve mechanism is open.

One embodiment of the present invention will now be described with reference to FIGS. 1 to 4. First, a refrigerant circuit of the present invention will be discussed with reference to FIG. 4 based on the difference between the present invention and the prior art refrigerant circuit of FIG. 5. Same or like reference numerals are given to parts in FIGS. 1 to 4 that are the same as or like corresponding parts in FIG. 5.

Figure 4:
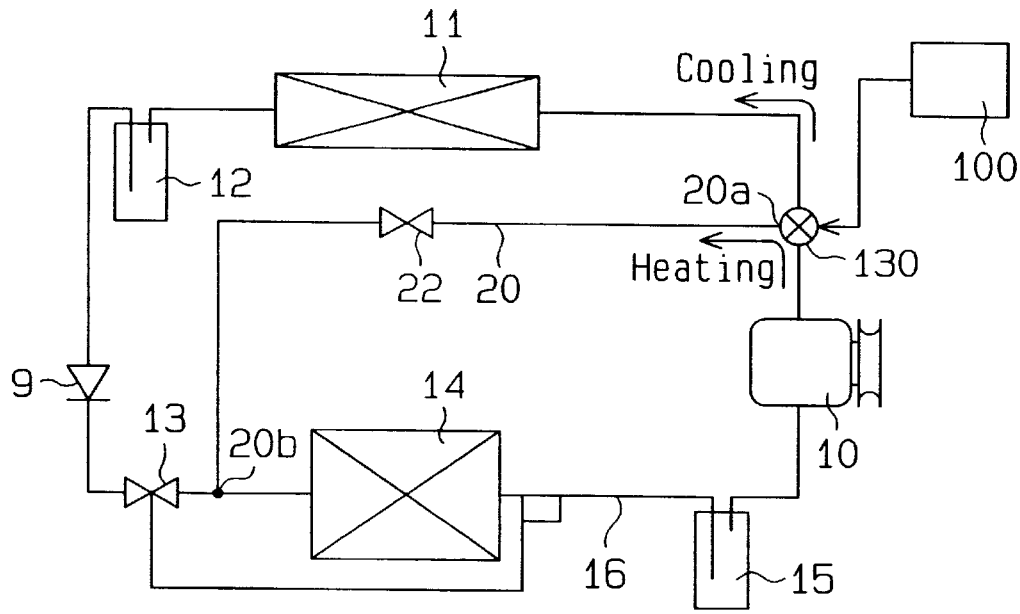
FIG. 4 is a block diagram showing a refrigerant circuit having the switch valve of FIG. 1.
Figure 5:
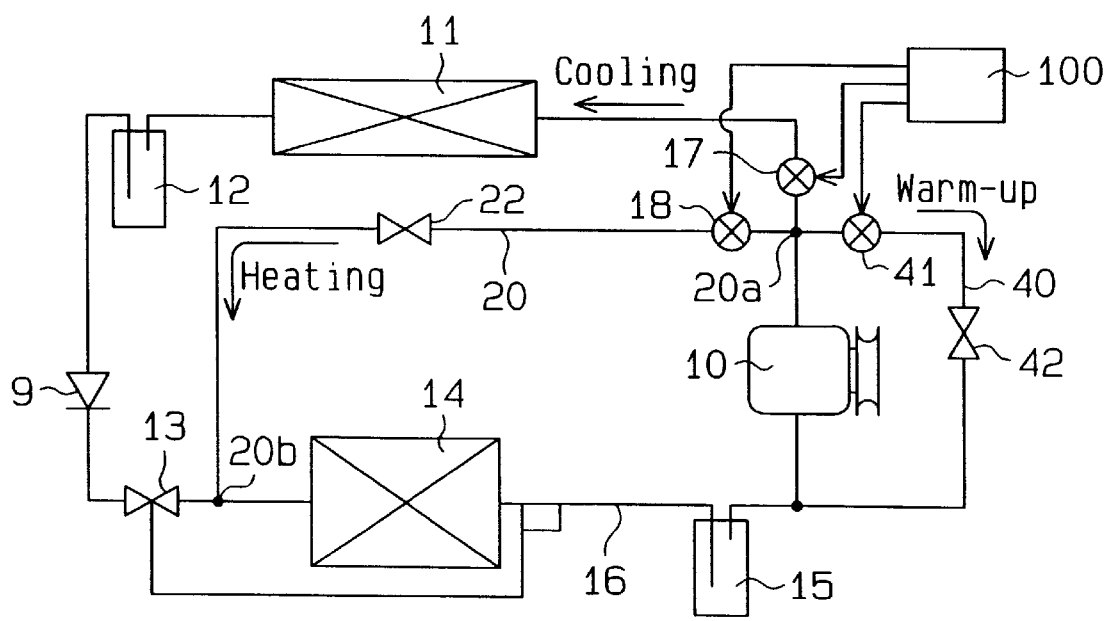
FIG. 5 is a block diagram showing a prior art refrigerant circuit.

As shown in FIG. 4, unlike the refrigerant circuit shown in FIG. 5, the refrigerant circuit does not include the second bypass pipe 40. That is, the refrigerant circuit of FIG. 4 has only the first bypass pipe 20 (hereinafter referred to simply as "bypass pipe 20"). Furthermore, the refrigerant circuit illustrated in FIG. 4 does not have the electromagnetic valves 17, 18, 41. That is, a single switch valve 130 replaces the electromagnetic valves 17, 18, 41. The switch valve 130 is located in the section of the pipe 16 between the compressor 10 and the condenser 11. The switch valve 130 is also connected to the inlet 20a of the bypass pipe 20.

Figure 2:
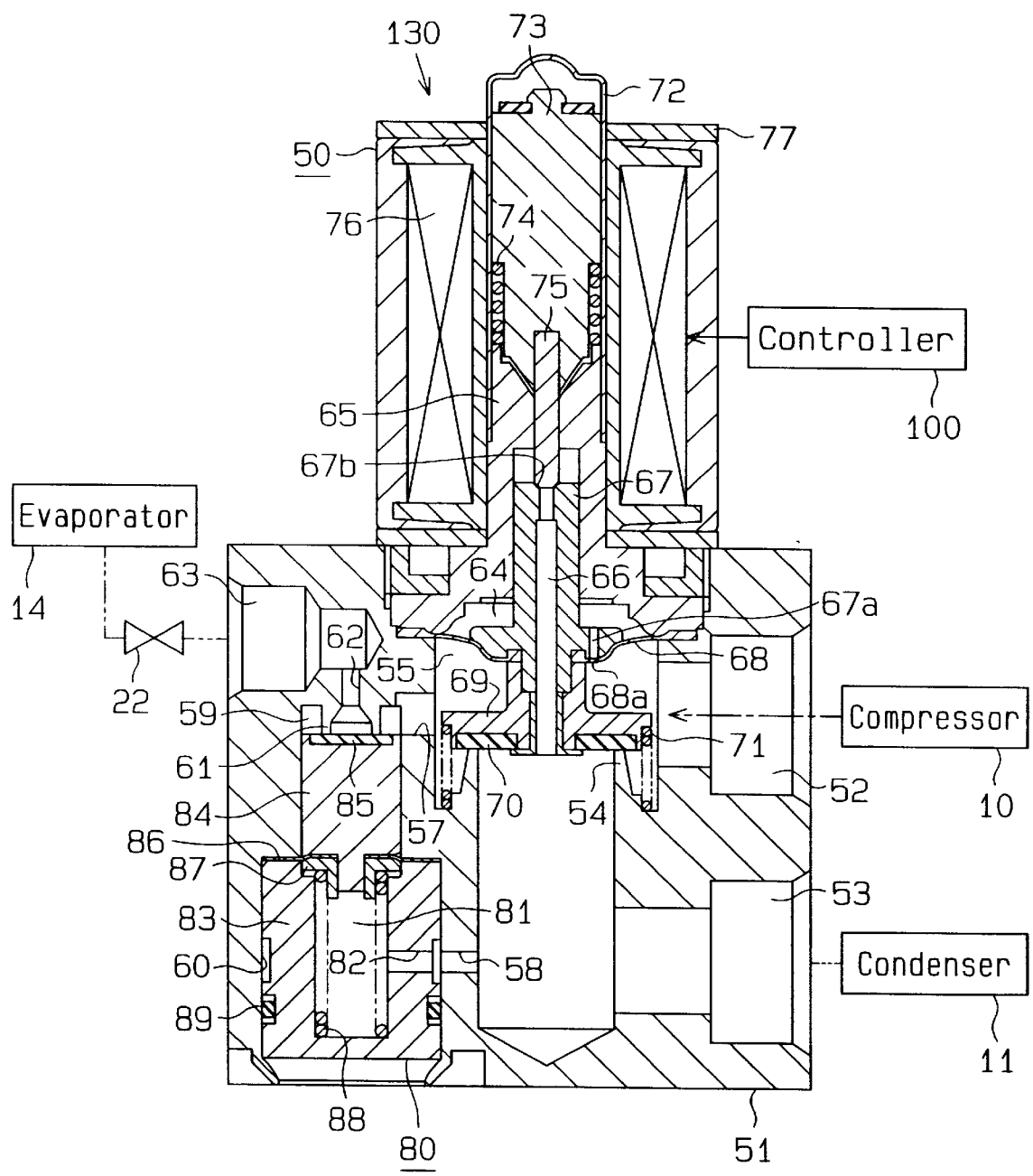
FIG. 2 is a cross-sectional view showing the switch valve of FIG. 1 when the first valve mechanism and a second valve mechanism are closed.
Figure 3:
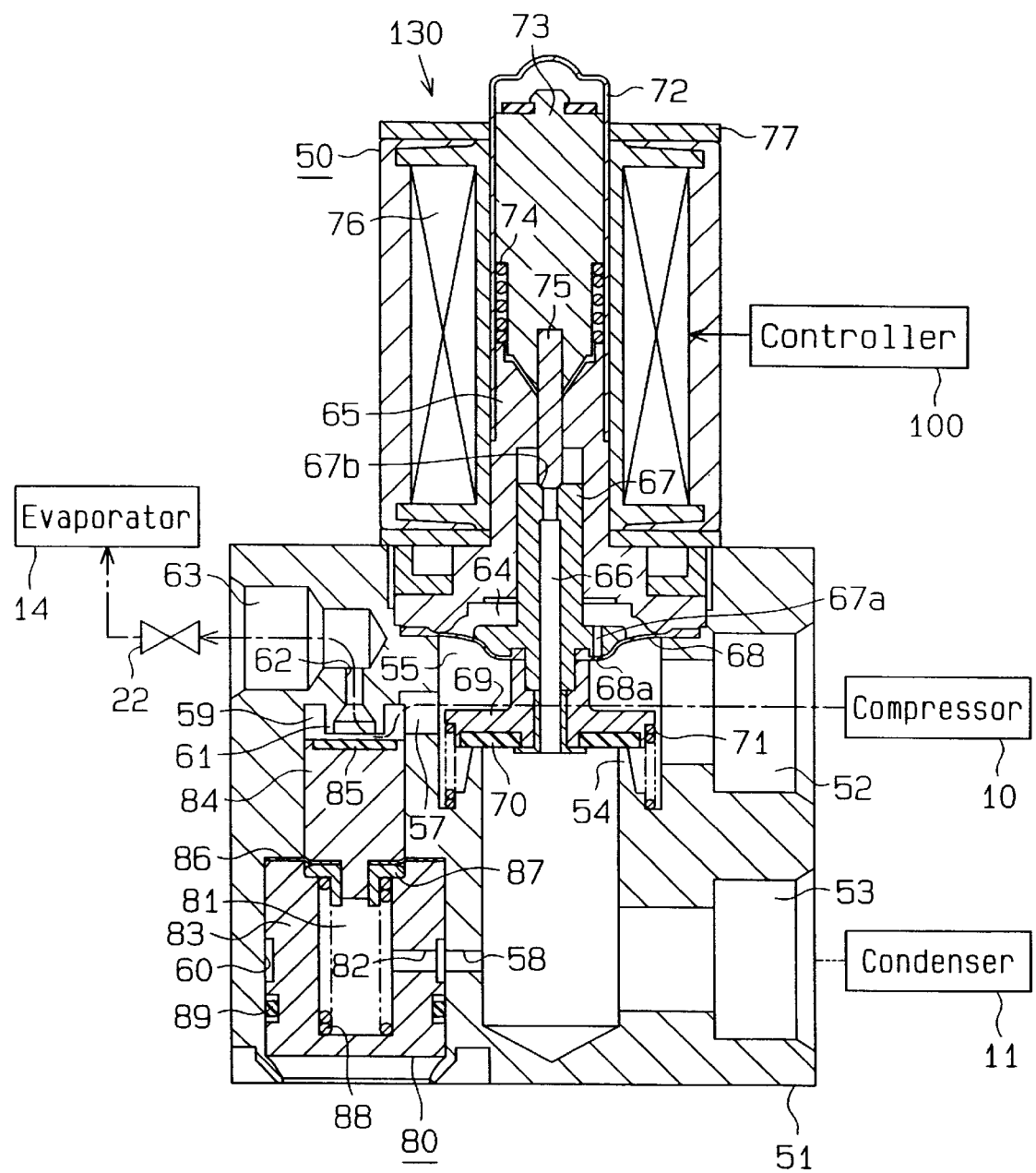
FIG. 3 is a cross-sectional view showing the switch valve of FIG. 1 when the first valve mechanism is closed and the second valve mechanism is open.

The switch valve 130 will hereafter be described. As shown in FIGS. 1 to 3, the switch valve 130 has a first valve mechanism 50, a second valve mechanism 80, and a single valve housing 51 accommodating the first and second valve mechanisms 50, 80. The first valve mechanism 50 is an electromagnetic valve and is located between the outlet of the compressor 10 and the inlet of the condenser 11. The controller 100 controls the first valve mechanism 50 to selectively open and close the section of the pipe 16 between the compressor 10 and the condenser 11. The second valve mechanism 80 is a differential pressure valve and is located between the outlet of the compressor 10 and the inlet of the depressurizing device 22. The second valve mechanism 80 selectively opens and closes the section of the pipe 16 between the compressor 10 and the depressurizing device 22, in accordance with the pressure difference between the outlet of the compressor 10 and the inlet of the condenser 11. Specifically, if the first valve mechanism 50 is closed and the pressure at the outlet of the compressor 10 is higher than the pressure at the inlet of the condenser 11 by a predetermined amount, the second valve mechanism 80 opens the section of the pipe 16 between the compressor 10 and the depressurizing device 22.

Next, the first valve mechanism 50 will be described in detail. The valve housing 51 includes a first passage 52 and a second passage 53. The first passage 52 is connected with the compressor 10, while the second passage 53 is connected with the condenser 11. The second passage 53 is bent substantially in an L-shaped manner. The first passage 52 communicates with the second passage 53 through a first valve chamber 55. The valve housing 51 has a substantially cylindrical, first valve seat 54. The first valve seat 54 is located between the first valve chamber 55 and the second passage 53. The first valve seat 54 defines a valve hole, which connects the first valve chamber 55 with the second passage 53.

The first valve mechanism 50 is incorporated in the valve housing 51, while a portion of the first valve mechanism 50 is received in the first valve chamber 55. A fixed core 65 is secured to the valve housing 51, while a guide rod 67 is supported by the fixed core 65. The guide rod 67 is axially movable and extends into the first valve chamber 55. A first valve body 69 is received in the first valve chamber 55 and is secured to the projecting end of the guide rod 67. The first valve body 69 faces the first valve seat 54 and selectively opens and closes the valve hole defined by the first valve seat 54. A packing 70 is attached to the surface of the first valve body 69 that faces the first valve seat 54. A coil spring 71 urges the first valve body 69 away from the valve seat 54.

The fixed core 65 has a recess that opens toward the first valve chamber 55. The recess defines a pressure chamber 64. A diaphragm 68 separates the pressure chamber 64 from the first valve chamber 55. The outer periphery of the diaphragm 68 is clamped between the valve housing 51 and the fixed core 65. An inner annulus of the diaphragm 68 is clamped between the guide rod 67 and the first valve body 69. The diaphragm 68 has a pressure receiving area that is larger than the cross-sectional area of the valve hole defined by the first valve seat 54. The guide rod 67 has a pressure introduction hole 67a, while the diaphragm 68 has a pressure introduction hole 68a. The pressure introduction holes 67a, 68a connect the pressure chamber 64 with the first valve chamber 55.

The fixed core 65 has an end projecting from the valve housing 51. A plunger tube 72 is secured to the projecting end of the fixed core 65. The plunger tube 72 accommodates a plunger 73. The plunger 73 is axially movable and opposes the fixed core 65. A coil spring 74 is located between the fixed core 65 and the plunger 73. The coil spring 74 urges the plunger 73 away from the fixed core 65. A needle 75 is secured to the plunger 73. The needle 75 extends through the fixed core 65 toward the guide rod 67. The tip of the needle 75 abuts against the guide rod 67. An electromagnetic coil 76 is provided around the plunger tube 72. A magnetic pole plate 77 is attached to a distal end of the electromagnetic coil 76. The fixed core 65, the plunger 73, and the electromagnetic coil 76 constitute an electromagnetic actuator for actuating the first valve body 69.

The fixed core 65 has a guide hole (unnumbered) for accommodating and guiding the guide rod 67. The guide rod 67 has a through hole 66 extending axially in the rod 67. The cross-sectional area of the through hole 66 is sufficiently larger than that of the pressure introduction hole 67a and that of the pressure introduction hole 68a. The through hole 66 communicates with the pressure chamber 64 through a space defined between the guide rod 67 and the wall of the guide hole. The needle 75 selectively opens and closes an adjacent opening of the through hole 66, or the upper opening as viewed in FIGS. 1 to 3. A valve seat 67b is formed on the end of the guide rod that is adjacent to the needle 75, or the upper end of the guide rod as viewed in FIGS. 1 to 3. The valve seat 67b defines the upper opening of the through hole 66, which is a valve hole. The needle 75 functions as a valve body contacting and separating from the valve seat 67b.

When the controller 100 supplies no electric current to the electromagnetic coil 76, the force of the coil spring 74 separates the plunger 73 from the fixed core 65, as shown in FIG. 1. In the same manner, the force of the coil spring 71 separates the first valve body 69 from the first valve seat 54. Accordingly, the first passage 52 is connected with the second passage 53 through the first valve chamber 55, thus connecting the compressor 10 with the condenser 11. In this state, the tip of the needle 75 is separate from the valve seat 67b such that the through hole 66 is open.

When the controller 100 supplies electric current to the electromagnetic coil 76, the electric current generates electromagnetic attraction between the plunger 73 and the fixed core 65. The plunger 73 thus moves toward the fixed core 65 against the force of the coil spring 74. Accordingly, as shown in FIG. 2, the tip of the needle 75 abuts against the valve seat 67b, thus closing the through hole 66. The needle 75 also moves the first valve body 69 toward the first valve seat 54 through the guide rod 67. The first valve body 69 thus abuts against the first valve seat 54 and disconnects the first valve chamber 55 from the second passage 53. In this manner, the compressor 10 is disconnected from the condenser 11.

As the guide rod 67 and the first valve body 69 move toward the first valve seat 54, the volume of the pressure chamber 64 increases. If the pressure chamber 64 were sealed, the pressure in the pressure chamber 64 would decrease as the volume of the pressure chamber 64 increases. This would hamper movement of the first valve body 69. However, in this embodiment, while the volume of the pressure chamber 64 is increasing, the refrigerant gas in the first valve chamber 55 flows into the pressure chamber 64 through the pressure introduction holes 68a, 67a.

Accordingly, the first valve body 69 moves smoothly toward the first valve seat 54.

The packing 70 attached to the first valve body 69 tightly contacts the first valve seat 54 without defining a space between the packing 70 and the first valve seat 54.

Furthermore, the tip of the needle 75 closes the through hole 66. This structure reliably seals the first valve chamber 55 with respect to the second passage 53.

If the controller 100 stops the current supply to the electromagnetic coil 76 when the switch valve 130 is in the state shown in FIG. 2, electromagnetic attraction is no longer produced between the plunger 73 and the fixed core 65. The coil spring 74 thus urges the plunger 73 away from the fixed core 65. Meanwhile, the force of the coil spring 71 separates the first valve body 69 and the guide rod 67 from the first valve seat 54. Accordingly, the first valve chamber 55 is connected with the second passage 53.

When the compressor 10 operates with the switch valve 130 in the state of FIG. 2, the high-pressure refrigerant gas discharged by the compressor 10 increases the pressure in the first valve chamber 55 and the pressure chamber 64. However, the pressure in the second passage 53, which is connected to the condenser 11, remains relatively low. Thus, the pressure in the first valve chamber 55 presses the first valve body 69 against the first valve seat 54. In this state, although the current supply to the electromagnetic coil 76 is stopped, which causes the plunger 73 to separate from the fixed core 65, the pressure of the first valve chamber 55 continuously presses the first valve body 69 against the first valve seat 54. That is, the first valve body 69 remains in contact with the first valve seat 54.

However, in this embodiment, if the plunger 73 separates from the fixed core 65, the needle 75 is separated from the valve seat 67b to open the through hole 66. Accordingly, the refrigerant in the pressure chamber 64 flows to the second passage 53 through the space between the guide rod 67 and the associated wall of the guide hole and the through hole 66, in accordance with the pressure difference between the second passage 53 and the pressure chamber 64. The pressure in the pressure chamber 64 thus becomes lower than the pressure in the first valve chamber 55. Accordingly, an urging member, which is the diaphragm 68 in this embodiment, urges the first valve body 69 to separate from the first valve seat 54 in accordance with the pressure difference between the pressure chamber 64 and the first valve chamber 55. In this manner, the force of the diaphragm 68 and the force of the coil spring 71 reliably separate the first valve body 69 from the first valve seat 54.

The following is a detailed description of the second valve mechanism 80. As shown in FIGS. 1 to 3, the valve housing 51 further includes an accommodating recess 60 and a second valve chamber 59, which is joined with the accommodating recess 60. A cylindrical support 83 is fixed in the accommodating recess 60. A seal ring 89 is fitted in a space between the support 83 and the wall of the accommodating recess 60. A second valve body 84 is received in the second valve chamber 59 and moves axially in the second valve chamber 59.

The support 83 has a pressure chamber 81, which opens toward the second valve chamber 59. The support 83 has a communication hole 82, and the valve housing has a communication hole 58. The communication holes 82, 58 connect the pressure chamber 81 with the second passage 53.

Thus, the pressure in the second passage 53 is the same as that of the pressure chamber 81 due to the communication holes 82, 85.

The diaphragm 86, or a pressure sensitive body, separates the pressure chamber 81 from the second valve chamber 59. The outer periphery of the diaphragm 86 is clamped between the valve housing 51 and the support 83. The diaphragm 86 also has an inner annulus that is clamped between the second valve body 84 and a metal support 87.

The valve housing 51 has a third passage 63 connected with the depressurizing device 22. The third passage 63 communicates with the first valve chamber 55 through a communication hole 62, the second valve chamber 59, and a communication hole 57. The pressure in the first valve chamber 55 is the same as that of the second valve chamber 59 because of the communication hole 57.

The valve housing 51 has an annular, second valve seat 61 located between the communication hole 62 and the second valve chamber 59. The second valve seat 61 defines a valve hole connecting the second valve chamber 59 with the communication hole 62. The second valve body 84 opposes the second valve seat 61 and selectively opens and closes the valve hole defined by the second valve seat 61. A packing 85 is attached to an end of the second valve body 84 that opposes the second valve seat 61. A coil spring 88 is accommodated in the pressure chamber 81 and urges the second valve body 84 toward the second valve seat 61.

The second valve body 84 moves in accordance with the pressure difference between the second valve chamber 59 and the pressure chamber 81, which are separated from each other by the diaphragm 86. Specifically, when the pressure in the second valve chamber 59 becomes higher than the pressure in the pressure chamber 81 by a predetermined amount (in this embodiment, 0.49 MPa), the second valve body 84 separates from the second valve seat 61, as shown in FIG. 3.

Therefore, the first valve chamber 55 communicates with the third passage 63. The force of the coil spring 88 is selected such that the pressure difference between the second valve chamber 59 and the pressure chamber 81 required for opening the second valve mechanism 80 is 0.49 MPa.

When the air conditioner cools the passenger compartment, the controller 100 supplies no electric current to the electromagnetic coil 76 of the first valve mechanism 50. Thus, as shown in FIG. 1, the first valve body 69 separates from the first valve seat 54 such that the first valve chamber 55 is connected to the second passage 53. Accordingly, the refrigerant discharged by the compressor 10 flows to the condenser 11 via the first passage 52, the first valve chamber 55, and the second passage 53.

In this state, the pressure in the first valve chamber 55 is substantially equal to the pressure in the second passage 53. In other words, the pressure in the second valve chamber 59 is substantially equal to the pressure in the pressure chamber 81. Accordingly, the coil spring 88 holds the second valve body 84 against the second valve seat 61. The compressor 10 is thus disconnected from the bypass passage 20.

As a result, the refrigerant circulates in the refrigerant circuit that includes the compressor 10, the switch valve 130, the condenser 11, the receiver 12, the check valve 9, the depressurizing device 13, the evaporator 14, and the accumulator 15. Therefore, the air conditioner cools the passenger compartment.

When the air conditioner warms the passenger compartment, the controller 100 supplies electric current to the electromagnetic coil 76 of the first valve mechanism 50. Thus, as shown in FIG. 2, the first valve body 69 abuts against the first valve seat 54 such that the first valve chamber 55 is disconnected from the second passage 53. Accordingly, the refrigerant discharged by the compressor 10 does not flow to the condenser 11 but gradually increases the pressure in the first valve chamber 55. Meanwhile, the pressure in the second passage 53, which communicates with the condenser 11, gradually decreases.

As long as the pressure difference between the first valve chamber 55 and the second passage 53, or the pressure difference between the second valve chamber 59 and the pressure chamber 81, is smaller than 0.49 MPa, the second valve body 84 is held against the second valve seat 61. In other words, the air conditioner performs a warm-up procedure for warming the passenger compartment.

When a certain time elapses after the controller 100 is instructed to initiate the warming of the passenger compartment, the pressure difference between the second valve chamber 59 and the pressure chamber 81 becomes larger than 0.49 MPa. The second valve body 84 thus separates from the second valve seat 61, as shown in FIG. 3. Accordingly, the first valve chamber 55 is connected with the third passage 63. The refrigerant gas from the compressor 10 is thus permitted to flow to the bypass pipe 20. The refrigerant gas, or hot gas, circulates in the hot gas circuit that includes the compressor 10, the switch valve 130, the depressurizing device 22, the evaporator 14, and the accumulator 15. Therefore, the air conditioner performs a normal procedure for the warming of the passenger compartment.

As described above, this embodiment of the present invention employs the single switch valve 130 for switching the refrigerant circuit between a cooling operation and a warming operation. The switch valve 130 includes the first and second valve mechanisms 50, 80 accommodated in the single valve housing 51. Thus, as compared to the prior art refrigerant circuit illustrated in FIG. 5, the refrigerant circuit of the present invention has a relatively simple structure and a lower manufacturing cost. Furthermore, electric current is supplied only to the first valve mechanism 50. This structure simplifies the control procedure for the air conditioner and reduces power consumption.

Furthermore, at least one of the first and second valve mechanisms 50, 80 is open unless the air conditioner is performing the warm-up procedure of the warming operation. This structure prevents the switch valve 130 from completely blocking the refrigerant gas flowing from the compressor 10. The pressure in the refrigerant circuit thus does not increase excessively, which prevents damages to the refrigerant circuit.

The pressure for operating the second valve body 84, or the pressure difference between the second valve chamber 59 and the pressure chamber 81 required for opening the second valve mechanism 80, is easily selected by altering the force of the coil spring 88.

Furthermore, the switch valve of the present invention is applicable to various types of fluid circuits other than a refrigerant circuit.

The present embodiment is to be considered as illustrative and not restrictive and the invention is not to be limited to the details given herein, but may be modified within the scope and equivalence of the appended claims.

What is claimed is:

1. A switch valve comprising:
    a single valve housing;
    a first passage formed in the valve housing to permit a fluid to flow into the valve housing;
    a second passage formed in the valve housing to permit, at selected times, the fluid in the first passage to exit the valve housing;
    a third passage formed in the valve housing to permit, at selected times, the fluid in the first passage to exit the valve housing;
    a first valve mechanism incorporated in the valve housing for selectively connecting and disconnecting the first passage with the second passage in accordance with an external instruction; and
    a second valve mechanism incorporated in the valve housing, wherein the second valve mechanism selectively connects and disconnects the first passage with the third passage in accordance with the difference between the pressure in the first passage and the pressure in the second passage when the first valve mechanism is closed, and wherein the second valve mechanism is always closed when the first valve mechanism is open.

2. The switch valve as set forth in claim 1, wherein the second valve mechanism connects the first passage with the third passage if the pressure in the first passage is higher than the pressure in the second passage by a predetermined amount.

3. The switch valve as set forth in claim 1, wherein the first valve mechanism is an electromagnetic valve.

4. The switch valve as set forth in claim 1, wherein the first valve mechanism includes:
    a valve seat located between the first passage and the second passage;
    a valve body opposing the valve seat, wherein the valve body separates from the valve seat to connect the first passage with the second passage, and wherein the valve body contacts the valve seat to disconnect the first passage from the second passage; and
    an electromagnetic actuator for actuating the valve body, wherein the valve body separates from the valve seat when no electric current is supplied to the electromagnetic actuator, and wherein the valve body contacts the valve seat when an electric current is supplied to the electromagnetic actuator.

5. The switch valve as set forth in claim 4, wherein the first valve mechanism further includes an urging member for urging the valve body away from the valve seat in accordance with the pressure difference between the first passage and the second passage if a current supply to the electromagnetic actuator is stopped when the valve body is in contact with the valve seat.

6. The switch valve as set forth in claim 5, wherein the urging member includes a diaphragm.

7. The switch valve as set forth in claim 1, wherein the second valve mechanism includes:
- a valve seat located between the first passage and the third passage;
- a valve body opposing the valve seat, wherein the valve body separates from the valve seat to connect the first passage with the third passage, and wherein the valve body contacts the valve seat to disconnect the first passage from the third passage;
- a first pressure chamber connected with the first passage;
- a second pressure chamber connected with the second passage; and
- a pressure sensitive body separating the first pressure chamber from the second pressure chamber, wherein the pressure sensitive body moves the valve body in accordance with the pressure difference between the first pressure chamber and the second pressure chamber.

8. The switch valve as set forth in claim 7, wherein the second valve mechanism further includes a spring for urging the valve body toward the valve seat, and wherein the pressure sensitive body separates the valve body from the valve seat against the force of the spring if the pressure in the first pressure chamber is higher than the pressure in the second pressure chamber by a predetermined amount.

9. A switch valve comprising:
- a single valve housing;
- a first passage formed in the valve housing to permit a fluid to flow into the valve housing;
- a second passage formed in the valve housing to permit, at selected times, the fluid in the first passage to exit the valve housing;
- a third passage formed in the valve housing to permit, at selected times, the fluid in the first passage to exit the valve housing;
- a first valve mechanism incorporated in the valve housing for selectively connecting and disconnecting the first passage with the second passage in accordance with an external instruction; and
- a second valve mechanism incorporated in the valve housing for selectively connecting and disconnecting the first passage with the third passage in accordance with the difference between a pressure in the first passage and a pressure in the second passage, wherein, when the first valve mechanism is closed, the second valve mechanism connects the first passage with the third passage if the pressure in the first passage is higher than the pressure in the second passage by a predetermined amount.

* * * * *

US006367506C1

(12) EX PARTE REEXAMINATION CERTIFICATE (5534th)
United States Patent
Takagi et al.

(10) Number: US 6,367,506 C1
(45) Certificate Issued: Sep. 26, 2006

(54) SWITCH VALVE FOR HOT GAS CIRCUIT OF REFRIGERANT CIRCUIT

(75) Inventors: Noboru Takagi, Ogaki (JP); Tetsuo Hirose, Ogaki (JP)

(73) Assignee: Pacific Industrial Co., Ltd., Ogaki (JP)

Reexamination Request:
No. 90/006,880, Dec. 3, 2003

Reexamination Certificate for:
Patent No.: 6,367,506
Issued: Apr. 9, 2002
Appl. No.: 09/535,453
Filed: Mar. 24, 2000

(30) Foreign Application Priority Data

Aug. 18, 1999 (JP) .......................... 11-231145

(51) Int. Cl.
*F16K 11/24* (2006.01)

(52) U.S. Cl. ............... 137/881; 137/119.03; 137/119.1; 251/30.04

(58) Field of Classification Search ............ 137/119.02, 137/119.03, 119.04, 119.09, 119.1, 881; 251/30.03, 251/30.04, 38, 44, 45, 46
See application file for complete search history.

(56) References Cited

U.S. PATENT DOCUMENTS

| 4,178,240 A | * 12/1979 | Pinkerton ................... 137/99 |
| 4,270,726 A | * 6/1981 | Hertfelder et al. ....... 251/30.03 |
| 5,299,592 A | 4/1994 | Swanson |

FOREIGN PATENT DOCUMENTS

| JP | 57-01666 | 1/1982 |
| JP | 07-217870 A | 8/1995 |

OTHER PUBLICATIONS

"Refrigeration and Air Conditioning Handbook, vol. I, Fundamentals, JAR Handbook Fundamentals," Fifth Edition, pp. 6–9, 251 and 349, Japanese Association of Refrigeration (Jun. 1993).

* cited by examiner

*Primary Examiner*—Stephen M. Hepperle

(57) ABSTRACT

A switch valve is provided in a refrigerant circuit. The switch valve includes a first valve mechanism, a second valve mechanism, and a single valve housing incorporating the first and second valve mechanisms. The first valve mechanism is an electromagnetic valve. The first valve mechanism selectively connects and disconnects an outlet of a compressor with an inlet of a condenser in accordance with an electric current supply. The second valve mechanism is a differential pressure valve. The second valve mechanism selectively connects and disconnects the outlet of the compressor with an inlet of an evaporator in accordance with a difference between the pressure at the outlet of the compressor and the pressure at the inlet of the condenser. In this manner, the single switch valve, which includes the first and second valve mechanisms incorporated in the same valve housing, switches the refrigerant circuit between a path for a cooling operation and a path for a warming operation. This structure simplifies the configuration of the refrigerant circuit.

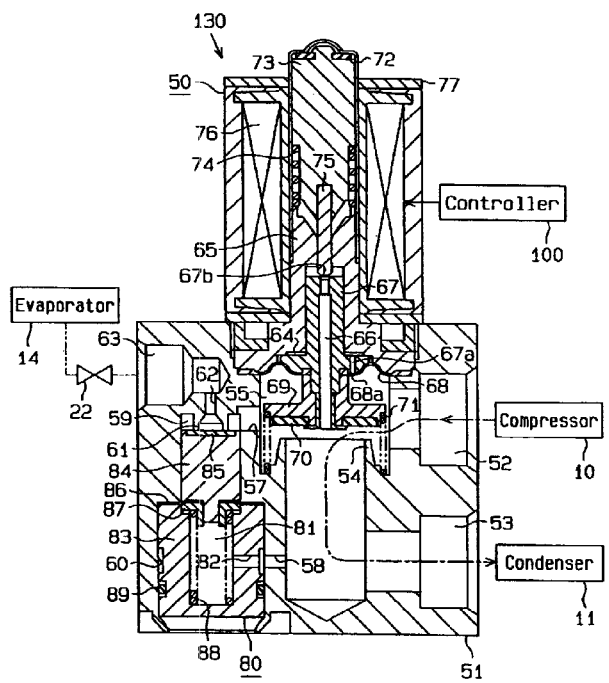

US 6,367,506 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claims 1, 7 and 9 are determined to be patentable as amended.

Claims 2, 4–6 and 8, dependent on an amended claim, are determined to be patentable.

New claims 10–12 are added and determined to be patentable.

1. A switch valve *incorporated in a refrigerant circuit including a compressor, a condenser and an evaporator, said switch valve* comprising:
   a single valve housing;
   a first passage formed in the valve housing to permit a [fluid] *refrigerant* to flow into the valve housing, *wherein the first passage is connected with an outlet of the compressor*;
   a second passage formed in the valve housing to permit, at selected times, the [fluid] *refrigerant* in the first passage to exit the valve housing, *wherein the second passage is connected with an inlet of the condenser*;
   a third passage formed in the valve housing to permit, at selected times, the [fluid] *refrigerant* in the first passage to exit the valve housing, *wherein the third passage is connected with an inlet of the evaporator*;
   a first valve mechanism incorporated in the valve housing for selectively connecting and disconnecting the first passage with the second passage in accordance with [an external instruction] *a supply of current, wherein the first valve mechanism is an electromagnetic valve, the first valve mechanism being open when no current is supplied and being closed when a current is supplied*; and
   a second valve mechanism incorporated in the valve housing, wherein the second valve mechanism selectively connects and disconnects the first passage with the third passage in accordance with the difference between the pressure in the first passage and the pressure in the second passage when the first valve mechanism is closed, and wherein the second valve mechanism is always closed when the first valve mechanism is open,
   *wherein the second valve mechanism includes a valve seat located between the first passage and the third passage, a valve body opposing the valve seat, a first pressure chamber connected with the first passage, a second pressure chamber connected with the second passage, and a pressure sensitive body separating the first pressure chamber from the second pressure chamber, and*
   *wherein the pressure sensitive body moves the valve body in accordance with the pressure difference between the first pressure chamber and the second pressure chamber, and wherein the pressure sensitive body is a diaphragm.*

7. The switch valve as set forth in claim 1, [wherein the second valve mechanism includes:
   a valve seat located between the first passage and the third passage;
   a valve body opposing the valve seat,] *wherein the valve body separates from the valve seat to connect the first passage with the third passage, and wherein the valve body contacts the valve seat to disconnect the first passage from the third passage*[;
   a first pressure chamber connected with the first passage;
   a second pressure chamber connected with the second passage; and
   a pressure sensitive body separating the first pressure chamber from the second pressure chamber, wherein the pressure sensitive body moves the valve body in accordance with the pressure difference between the first pressure chamber and the second pressure chamber].

9. A switch valve *incorporated in a refrigerant circuit including a compressor, a condenser and an evaporator, said switch valve* comprising:
   a single valve housing;
   a first passage formed in the valve housing to permit a [fluid] *refrigerant* to flow into the valve housing, *wherein the first passage is connected with an outlet of the compressor*;
   a second passage formed in the valve housing to permit, at selected times, the [fluid] *refrigerant* in the first passage to exit the valve housing, *wherein the second passage is connected with an inlet of the condenser*;
   a third passage formed in the valve housing to permit, at selected times, the [fluid] *refrigerant* in the first passage to exit the valve housing, *wherein the third passage is connected with an inlet of the evaporator*;
   a first valve mechanism incorporated in the valve housing for selectively connecting and disconnecting the first passage with the second passage in accordance with [an external instruction] *a supply of current, wherein the first valve mechanism is an electromagnetic valve, the first valve mechanism being open when no current is supplied and being closed when a current is supplied*; and
   a second valve mechanism incorporated in the valve housing for selectively connecting and disconnecting the first passage with the third passage in accordance with the difference between a pressure in the first passage and a pressure in the second passage, wherein, when the first valve mechanism is closed, the second valve mechanism connects the first passage with the third passage if the pressure in the first passage is higher than the pressure in the second passage by a predetermined amount.

*10. The switch valve as set forth in claim 9, wherein the second valve mechanism comprises:*
   *a valve seat located between the first passage and the third passage;*
   *a valve body opposing the valve seat;*
   *a first pressure chamber connected with the first passage;*
   *a second pressure chamber connected with the second passage; and* a pressure sensitive body separating the first pressure chamber from the second pressure chamber, wherein the pressure sensitive body moves the valve body in accordance with the pressure difference between the first pressure chamber and the second pressure chamber, and wherein the pressure sensitive body is a diaphragm.

11. The switch valve as set forth in claim 10, wherein the diaphragm is fixed to the valve housing.

12. The switch valve as set forth in claim 9, wherein the refrigerant exits the compressor and passes through the condenser and the evaporator and returns to the compressor when the first valve mechanism is open and the second valve mechanism is closed, and wherein the refrigerant exits the compressor and passes through the evaporator and returns to the compressor without passing through the condenser when the first valve mechanism is closed and the second valve mechanism is open.

* * * * *